United States Patent [19]

Tashiro

[11] 4,179,659
[45] Dec. 18, 1979

[54] SIGNAL TRANSMISSION SYSTEM
[75] Inventor: Isao Tashiro, Kawasaki, Japan
[73] Assignee: Tokyo Shibaura Electric Co., Ltd., Kawasaki, Japan
[21] Appl. No.: 863,178
[22] Filed: Dec. 22, 1977
[30] Foreign Application Priority Data
Dec. 25, 1976 [JP] Japan .................................. 51/156960
[51] Int. Cl.² .................................. H03K 13/22
[52] U.S. Cl. .................................. 325/38 B; 332/11 D
[58] Field of Search ............ 340/347 AD; 332/11 D; 325/35 B, 41, 42; 179/15 AP; 358/135, 136

[56] References Cited
U.S. PATENT DOCUMENTS

| 3,403,226 | 9/1968 | Wintringham | 358/135 X |
| 3,502,986 | 3/1970 | Lucky | 325/42 |
| 3,825,832 | 7/1974 | Frei et al. | 358/135 |

*Primary Examiner*—Benedict V. Safourek
*Attorney, Agent, or Firm*—Flynn & Frishauf

[57] ABSTRACT

A transmission signal train-forming circuit is supplied with a differential pulse mode modulated signal train (a DPCM signal train) and a predictive signal train, both signal trains being coded from an input signal by an input signal coding circuit; a transmission signal train-forming circuit judges whether a series of words constituting a specified number of consecutive DPCM signals have the prescribed contents; and where it is detected that the words have the prescribed contents, then a transmission signal train is formed by inserting a specified pattern signal never used as a DPCM signal and a predictive signal into the positions of said words. A reproduction circuit detects the specified pattern signal from the received transmission signal train and reproduces the predictive signal train from the transmission signal train by inserting the transmitted predictive signal into the positions of the respective words previously replaced by the specified pattern signal and predictive signal.

8 Claims, 13 Drawing Figures

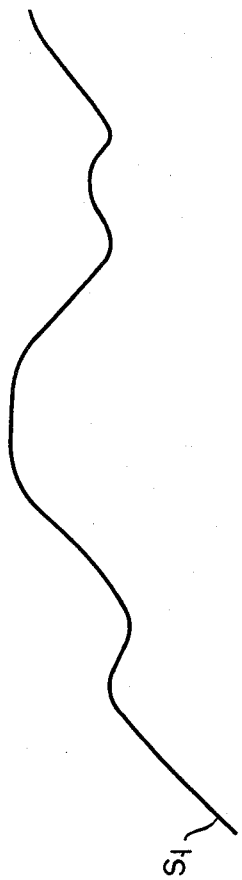
FIG. 2A INPUT SIGNAL S1
FIG. 2B SAMPLING TIME POINT
FIG. 2C DPCM SIGNAL S2
FIG. 2D ANALOGUE SIGNAL CONVERTED FROM S6
FIG. 2E TRANSMISSION SIGNAL S5
FIG. 2F DPCM SIGNAL CORRESPONDING TO FIG. 2D

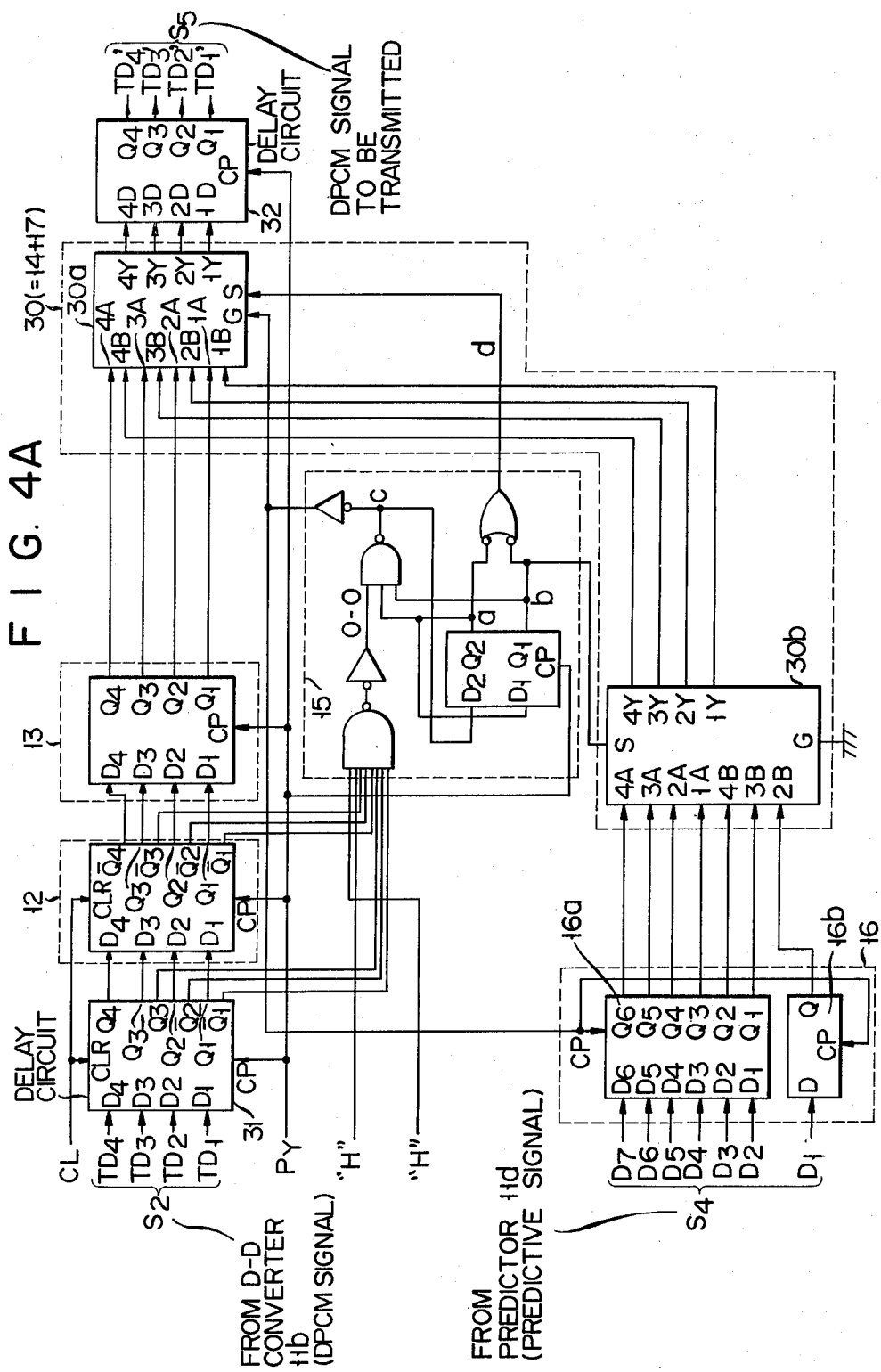
F I G. 4A

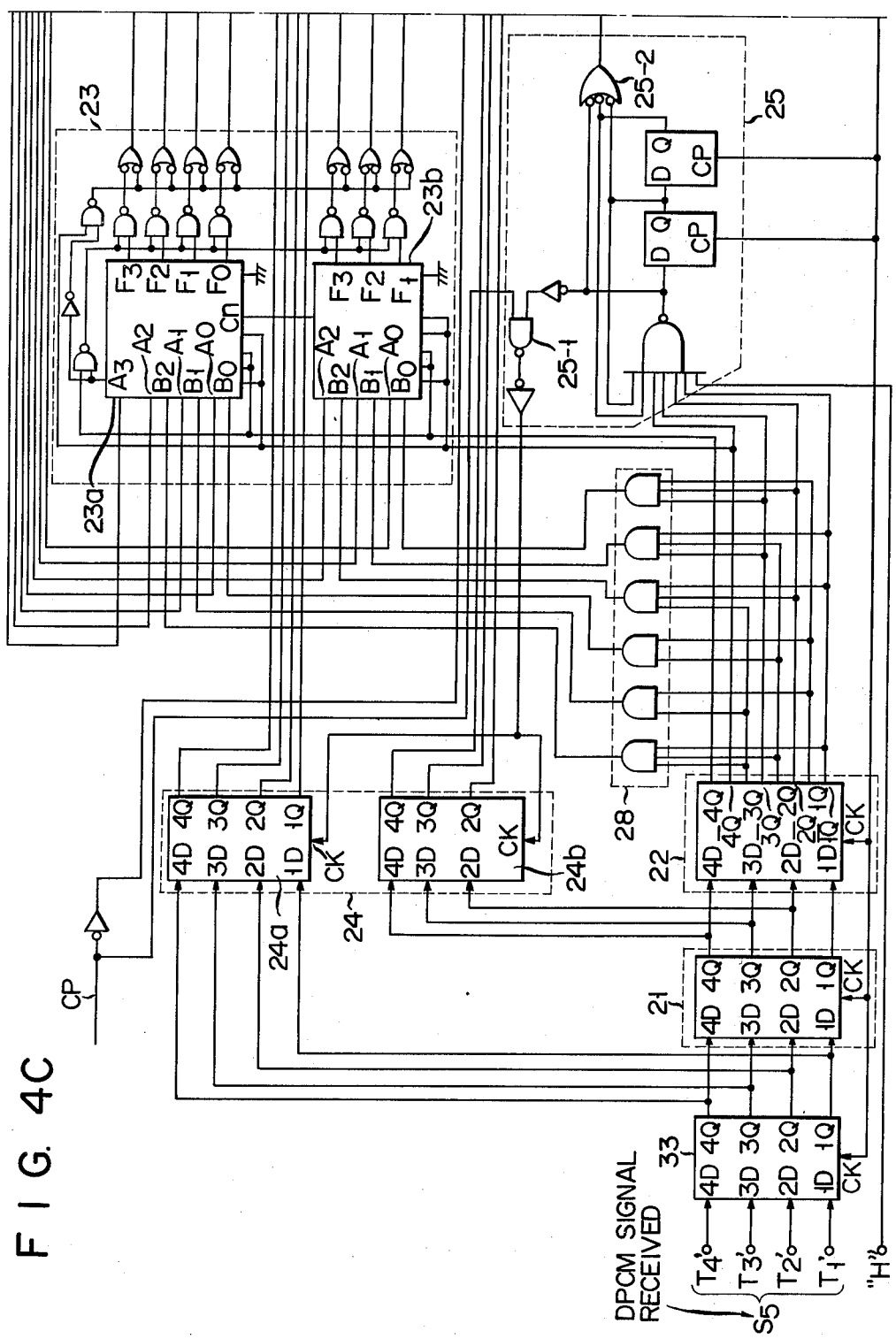

SIGNAL TRANSMISSION SYSTEM

BACKGROUND OF THE INVENTION

This invention relates to a signal transmission system, and more particularly to a signal transmission system by which an analogue signal is transmitted in the form converted into a differential pulse code modulated signal train (hereinafter referred to as a "DPCM signal train").

Where an analogue signal, for example, a video signal is transmitted, noise is often carried into the video signal during transmission with the resultant deterioration of picture quality. To avoid this undesirable event, the process has been developed of transmitting a video signal in digital form. However, transmission of the video signal in digital form, for example, in the form of a pulse code modulated (PCM) signal has the drawback that transmission consumes a great deal of time. To resolve this problem, the process has been proposed of transmitting a video signal in the form converted into a differential pulse code modulated (DPCM) signal train through application of a predictive signal train. Transmission of the DPCM signal train not only shortens transmission time, but also offers the later described advantages. Nevertheless, transmission of the DPCM signal train is defective in that once an error arises in the bit arrangement of any of the words constituting the DPCM signal train, all the succeeding DPCM signals are made to have erroneous data. According to the conventional process adopted for elimination of the above-mentioned difficulty, for example, transmission of a video signal in the form converted into the DPCM signal, a train of DPCM signals was transmitted by inserting a PCM signal into said train during each period of scanning one line, thereby correcting the bit error of the respective DPCM signals. Yet, deterioration occurred concentratedly in the right side portion of a reproduced picture. Further, the predictive signal was inserted into a train of DPCM signals, as is well known, at a uniform period. Since, however, each word constituting the predictive signal train had almost twice as many bits as those of each word constituting the DPCM signal train, data of one word constituting the DPCM signal train was lost in that section of said DPCM signal train where the predictive signal was inserted. Therefore, a limitation was imposed on the section of the DPCM signal train where the predictive signal was to be inserted or the frequency of inserting the predictive signal in a transmission signal train. Moreover, picture quality was deteriorated in that section of the DPCM signal train where the predictive signal was inserted.

Where a static picture was transmitted, it was possible to insert the predictive signal without losing the data of a word constituting the DPCM signal train. Still in this case, the problem was raised that an amount of data to be transmitted increased by the amount of data represented by the inserted predictive signal.

It is accordingly the object of this invention to provide a signal transmission system which enables a predictive signal to be inserted into a DPCM signal train more frequently than has been possible in the past without losing data denoted by the DPCM signals and increasing a total amount of data to be transmitted.

SUMMARY OF THE INVENTION

A signal transmission system according to this invention comprises input signal-coding means for sampling an input signal at a prescribed sampling period and converting the sampled data into a predictive signal train and a DPCM signal train, each signal train including the information of the input signal; transmission signal train-forming means which is supplied with the DPCM signal train and predictive signal train, and, where a specified group of adjacent words included in the DPCM signal train has the prescribed contents, inserts a specified pattern signal never applied as a DPCM signal and a predictive signal into the positions of the adjacent words, thereby forming a transmission signal train being transmitted; and predictive signal train-reproducing means for detecting the specified pattern signal from the received transmission signal train and inserting the transmitted predictive signal into the respective positions of the adjacent words, thereby reproducing the predictive signal train previously produced from the input signal-coding means out of the received transmission signal train.

In a specific embodiment, signal transmission system of this invention judges whether the second and third ones of, for example, three consecutive words of the DPCM signal train represent numerals 0 and 0 or whether the three consecutive words respectively indicate numerals $+1, -1, +1$ or $-1, +1, -1$. In this case, a transmission signal train is formed by inserting a specified pattern signal (which is expressed as binary code "0000" and is never applied as a DPCM signal) into the position of the first one of the three consecutive words and a predictive signal formed of seven bits into a space occupied by the last two words. The order in which the specified pattern signal and predictive signal are inserted into the positions of the consecutive words is not subject to any particular limitation. In other words, a group of, for example, three adjacent or consecutive words which indicate a relatively small numeral change from each other is selected from among the DPCM signal train. The specified pattern signal and predictive signal are inserted into the positions of the three words belonging to the selected group. The predictive signal inserted into the DPCM signal train corrects bit errors thereof which might occur during transmission. Deterioration of picture quality hitherto caused by a reproduced predictive signal is more decreased than in the past. No limitation is imposed on the selection of the section of the DPCM signal train into which the predictive signal is to be inserted. Nor is lost data included in DPCM signals.

BRIEF DESCRIPTION OF THE DRAWING

FIGS. 2A to 2F denote signals appearing in the respective blocks of FIG. 1;

FIG. 4A shows the detailed arrangement of the transmission signal train-forming circuit of FIG. 1;

FIGS. 4C and 4D set forth the detailed arrangement of the predictive signal reproduction circuit of FIG. 1.

DETAILED DESCRIPTION

Figure 1:
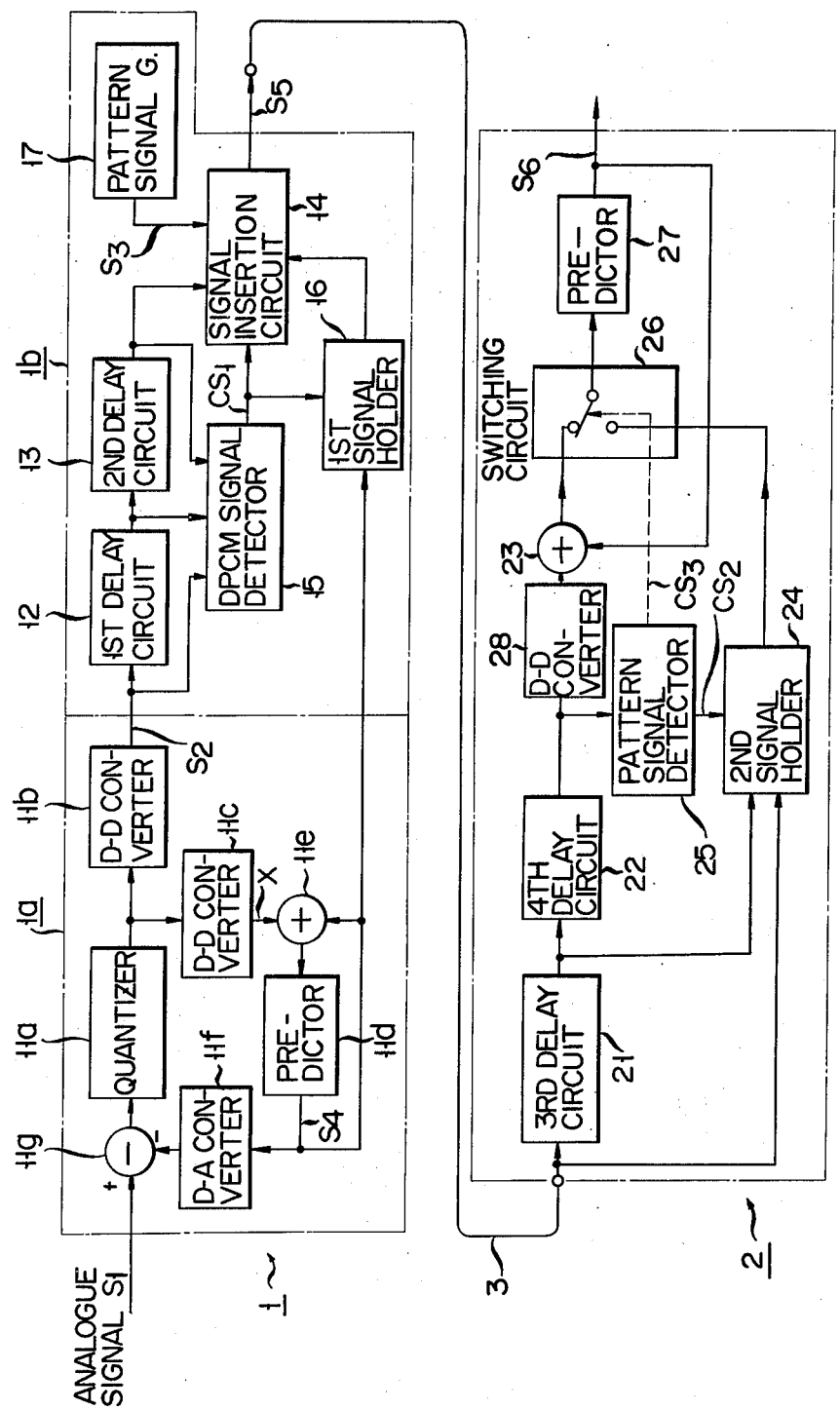
FIG. 1 is a block circuit diagram of a signal transmission system embodying this invention.

Referring to FIG. 1, a transmission section 1 and receiving section 2 are coupled together by a transmission line 3. The transmission section 1 includes an input signal-coding circuit 1a and a transmission signal train-forming circuit 1b. The coding circuit 1a converts a video signal $S_1$ delivered from, for example, a video camera into a DPCM signal train $S_2$. This coding circuit 1a comprises a quantizer 11a; digital-to-digital converters (D—D converters) 11b, 11c for converting outputs from the quantizer 11a; an adder 11e for adding together a digital signal from the D—D converter 11c and an output from a predictor 11d, writing added signals in the predictor 11d, and causing the predictor 11d to send forth a predictive signal train $S_4$ (digital signal train); a digital-analogue converter (D-A converter) 11f for converting the predictive signal train $S_4$ issued from the predictor 11d into an analogue signal; and a subtracter 11g for supplying the quantizer 11a with a signal denoting a difference between the amplitudes of the input analogue signal $S_1$ and an output analogue signal from the D-A converter 11f. The indicated coding circuit 1a is already known as a hybrid type. The words constituting the DPCM signal train $S_2$ are each formed of four bits. The transmission signal train-forming circuit 1b comprises first and second delay circuits 12, 13; a signal insertion circuit 14; a DPCM signal detection circuit 15; a first signal holder 16; and a specified pattern signal generator 17. The DPCM signal train $S_2$ is supplied to the signal insertion circuit 14 through the first and second delay circuits 12, 13. An output $S_2$ from the D—D converter 11b, an output from the first delay circuit 12 and an output from the second delay circuit 13 are delivered to the signal detection circuit 15. This circuit 15 judges whether the adjacent words constituted by the specified number of DPCM signals being transmitted respectively have the prescribed contents. In other words, the detection circuit 15 detects a predetermined regularity according to which the contents of the specified number of the DPCM signals, each being a predetermined content, are arranged. Where the regularity is detected, then the detection circuit 15 which includes, for example, a coincidence circuit sends forth a detection signal (control signal) $CS_1$. The predictor 11d generates a predictive signal each time the input signal $S_1$ is sampled. Each word constituting the predictive signal train $S_4$ is formed of, for example, seven bits. At the time of sampling when the input signal $S_1$ indicates a small amplitude change, the predictive signal has an value substantially equal to that which a pulse code modulated (PCM) signal indicates at said sampling time. When operated by the detection signal or control signal $CS_1$, the first signal holder 16 holds the predictive signal $S_4$ issued from the predictor 11d. The specified pattern signal generator 17 produces the later described pattern signal $S_3$ having a particular code never applied as the DPCM signal $S_2$. The signal insertion circuit 14 receives not only an output from the second delay circuit 13 but also the specified pattern signal $S_3$ and an output from the first signal holder 16. When the detection signal $CS_1$ is given forth, then the positions of, for example, three words constituting the DPCM signal train delivered from the second delay circuit 13 are occupied by the specified pattern signal $S_3$ and the predictive signal held by the first signal-holding circuit 16. The order in which both signals $S_3$, $S_4$ are inserted into the positions of the three words is not subject to any particular limitation. An output $S_5$ from the signal insertion circuit 14 is sent forth to, for example, the transmission line 3.

In the receiving section 2, that is, the predictive signal train reproduction circuit, the transmission signal train $S_5$ is conducted to an adder 23 through a third delay circuit 21, a fourth delay circuit 22 and D—D converter 28. An output from the fourth delay circuit 22 is carried to a detection circuit 25 of the specified pattern signal $S_3$. When detecting the specified pattern signal $S_3$ from the transmission signal train $S_5$, then the pattern signal detection circuit 25 generates first and second detection signals or control signals $CS_2$, $CS_3$. The transmission signal train $S_5$ and an output from the third delay circuit 22 are supplied to the input terminal of the second signal holder 24. When the first control signal $CS_2$ is issued, these input signals are held by the second signal holder 24. An output from the D—D converter 28 is delivered to the adder 23. The receiving section 2 further comprises a switching circuit 26 for selectively supplying an output from the adder 23 or an output from the second signal holder 24 to a predictor 27 when receipt of the second control signal $CS_3$. An output predictive signal $S_6$ from the predictor 27 is fed back to the adder 23. Upon receipt of the second control signal $CS_3$, an output from the second signal holder 24 is sent forth to the predictor 27. When said second control signal $CS_3$ is not issued, an output from the adder 23 is supplied to the predictor 27. An output from the predictor 27 which is the desired predictive signal train is converted into an analogue signal by a D-A converter (not shown).

There will now be described by reference to FIGS. 2A to 2F the operation of the signal transmission system of FIG. 1. When supplied to the subtracter 11g, an analogue signal, for example, a video signal $S_1$ shown in FIG. 2A is sampled in the coding circuit 1a at time points $t_1$ to $t_{16}$ indicated in FIG. 2B. When the sampled signal is processed in the coding circuit 1a, the D—D converter 11b issues the DPCM signal train $S_2$ of FIG. 2C. The four bits of the respective words constituting the DPCM signal train $S_2$ are delayed for one sampling period in the first and second delay circuits 12, 13 respectively, and then conducted to the signal-holding circuit 14. The DPCM signal detection circuit 15 judges whether the contents of three adjacent words constituting the DPCM signal train $S_2$, each being a predetermined content, are arranged in the predetermined regular order. Where the contents of the second and third ones of the three words are zero, or the three words represent "+1," "−1," "+1" or "−1," "+1," "−1," respectively, then the DPCM signal detection circuit 15 generates a detection signal or control signal $CS_1$. This control signal $CS_1$ causes the specified pattern signal $S_3$ to be inserted into the position of the first one of the three words constituting the DPCM signal $S_2$. When the control signal $CS_1$ is given forth, a predictive signal $S_4$ from the predictor 11d is held by the first signal holder 16. Each word constituting the predictive signal $S_4$ is formed of seven bits. This predictive signal $S_4$ is inserted into the positions of the second and third ones of the three words constituting the DPCM signals $S_2$. Thus, the signal insertion circuit 14 sends forth a train of DPCM signals or transmission signal train shown in FIG. 2E. With the foregoing embodiment, the regions of three words constituting the DPCM signal train to have the predetermined regular arrangement are indicated by numerals $P_1$, $P_2$, $P_3$, respectively. The region $P_1$ represents a group of three words whose contents are "+1," "−1," "+1," respectively and arranged in the order mentioned. The region $P_2$ denotes a group of three words whose contents are "+2," "0," "0," respectively and arranged in the order mentioned. The region P₃ shows a group of three words whose contents are "−1," "+1," "−1" and arranged in the order mentioned. Referring to FIG. 2E, a notation "*" shows that section of a DPCM signal train into which the specified pattern signal S₃ is inserted, and characters PDS indicate that section of said DPCM signal train into which a predictive signal S₄ is inserted.

In the receiving section 2, the transmission signal train S₅ is delayed by the third and fourth delay circuits 21, 22 for one sampling period respectively and supplied to the adder 23 through the D—D converter 28. The DPCM transmission signal train S₅ delivered to the adder 23 is added to an output predictive signal S₆ from the predictor 27, the output predictive signal being outputted at preceding sampling period. The specified pattern signal detection circuit 25 detects a specified pattern signal "*" from the DPCM signal train (FIG. 2E) causing the first control signal CS₂ to be supplied to the second signal holder 24. This second signal holder 24 holds the first four bits of a predictive signal received one sampling period after detection of the specified pattern signal and the last three bits of the same predictive signal received another sampling period later. The bit signals thus held are delivered to a switching circuit 26. Upon receipt of a second control signal CS₃, the contact of the switching circuit 26 is connected to the second signal holder 24, an output from the circuit 26 is conducted to the predictor 27. Since the contact of the switching circuit 26 is later connected to the adder 23, the words constituting the succeeding DPCM signals are converted into predictive signals. An output signal from the predictor 27 is a predictive signal train from which a waveform shown in FIG. 2D is obtained. That is, a D-A converter (not shown) converts the predictive signal into an analogue signal indicated by a broken line in FIG. 2D. When converted into DPCM signal train, the waveforms of FIG. 2D (including broken line portions) collectively provide a transmission signal train (FIG. 2F).

As is apparent from the foregoing description, a predictive signal S₄ is inserted into the positions of two adjacent ones of the three words constituting the DPCM signal train. This insertion is effected selectively in that section of the DPCM signal train where the values of the second and third ones of three words constituting the DPCM signal train are "0", or where the three words have the values of "+1," "−1," "+1," respectively or "−1," "+1," "−1," respectively, namely, in that section of the DPCM signal train where the three consecutive words show very little change in value. Therefore, a reproduced predictive signal train S₆ does not give rise to the substantial deterioration of picture quality. When a video signal is transmitted, deterioration of picture quality by a reproduced predictive signal train is of negligible order.

There will now be described the results of experiments conducted by the present inventors in connection with this invention. Simulation tests based on a computer system were undertaken on transmission of (A) a human figure including an outdoor background; (B) a human figure including an indoor background; (C) a half-length human figure; (D) a human face; (E) a full size human figure; and (F) another half-length human figure. The results are presented in Table 1 below.

Table 1

| Kind of figure | A number of the specified groups of DPCM words appearing in one scanning line, the contents of adjacent words being "0" respectively | A number of the specified groups of three DPCM words appearing in one scanning line, the contents of the three words being "+1", "−1", "+1", respectively or "−1", "+1", "−1", respectively | A number of predictive signals which can be inserted into a DPCM signal tran per period of scanning one line |
|---|---|---|---|
| A | 5.6 | 1.3 | 7 |
| B | 5.7 | 1.5 | 7 |
| C | 6.4 | 1.6 | 8 |
| D | 8.1 | 2.1 | 10 |
| E | 5.0 | 1.2 | 6 |
| F | 6.5 | 1.6 | 8 |

These numerals denote the number of times the above-mentioned particular groups of DPCM words or signals appear in one scanning line and the predictive signal can be inserted into a DPCM signal train as measured per period of scanning each line of the whole foreground figure. Table 1 above shows data obtained in the case where the coding circuit 1a (FIG. 1) has a code-depression-expansion characteristic illustrated in FIGS. 3A and 3B; each word constituting the DPCM signal train is formed of four bits; each word constituting a predictive signal is quantized to seven bits at minimum; one foreground figure has 400 horizontal scanning lines; and each scanning line contains 512 picture elements. Further, Table 1 shows that eight predictive signals can be inserted into a DPCM signal train on the average per period of scanning one line and that, particularly in the case of (D) as many as ten predictive signals can be inserted during the period of one scanning line. The signal transmission system of this invention has thus been proved to suppress the deterioration of reproduced picture quality caused by a reproduced predictive signal train S₆ even when a predictive signal is inserted into a DPCM signal train as often as mentioned above.

Figure 3A:
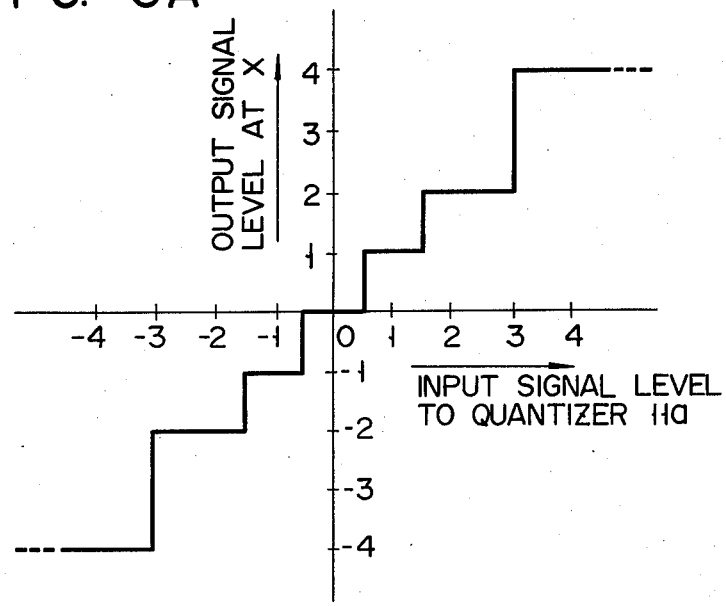
FIGS. 3A and 3B graphically illustrate the code depression-expansion characteristic of the coding circuit of FIG. 1.
Figure 3B:
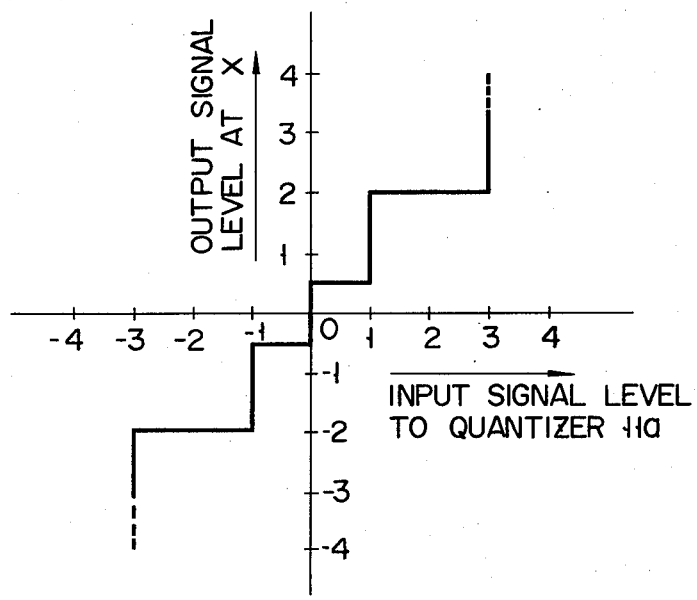

There will now be described the code depression-expansion characteristic illustrated in FIG. 3A. At the point where an input signal to the quantizer 11a has a zero level or in the proximity of said point, an output signal at X has a zero level. The zero level of this output signal at X point may be expressed as binary code "0000" or "1000." Since the output DPCM signal can have only one form of zero level with respect to the "+0" level or "−0" level of the input DPCM signal, the other form remains unused. Where the DPCM signal is made to have a zero level of binary code "1000" (binary bit "1" is a bit denoting a positive level), then the other code form of binary code "0000" can be used as a specified pattern signal never applied as a DPCM signal S₂. With this embodiment, the above-mentioned code "0000" is used as a specified pattern signal S₃.

There will now be described the code depression-expansion characteristic (FIG. 3B) of a coding circuit included in the signal transmission system of this invention. Where an input signal to the quantizer $11a$ has a "0" level, then an output signal at X point can have a level of "+0.5" or "−0.5." This means that the DPCM signal $S_2$ has a level other than "0." Namely, the DPCM signals $S_2$ may be expressed as "±0.5," "±1," "±2," "±4," "±8," ... The coding circuit $1a$ having the above-mentioned code depression-expansion characteristic (shown in FIG. 3B) obviously enables the predetermined regular arrangement of "+1," "−1," "+1" or "−1," "+1," "−1" of the previously defined to appear in a larger number of groups then when the coding circuit $1a$ has a code depression-expansion characteristic illustrated in FIG. 3A. Where the coding circuit $1a$ has the code depression-expansion characteristic of FIG. 3B, then it is possible to prevent a DPCM signal $S_2$ whose level is denoted by a larger digit, for example, "+8" from being used as such, and apply the output signal level of "+8" as a specified pattern signal $S_3$.

Figure 4B:
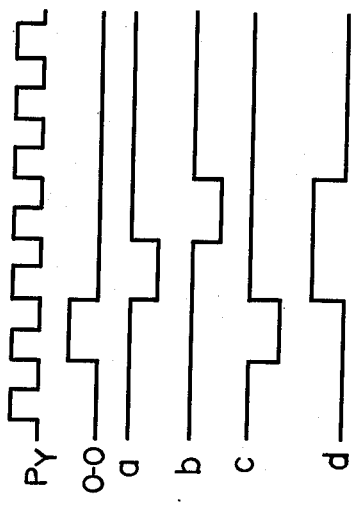
FIG. 4B indicates the waveforms of signals appearing in the various sections of FIG. 4A.
Figure 4D:
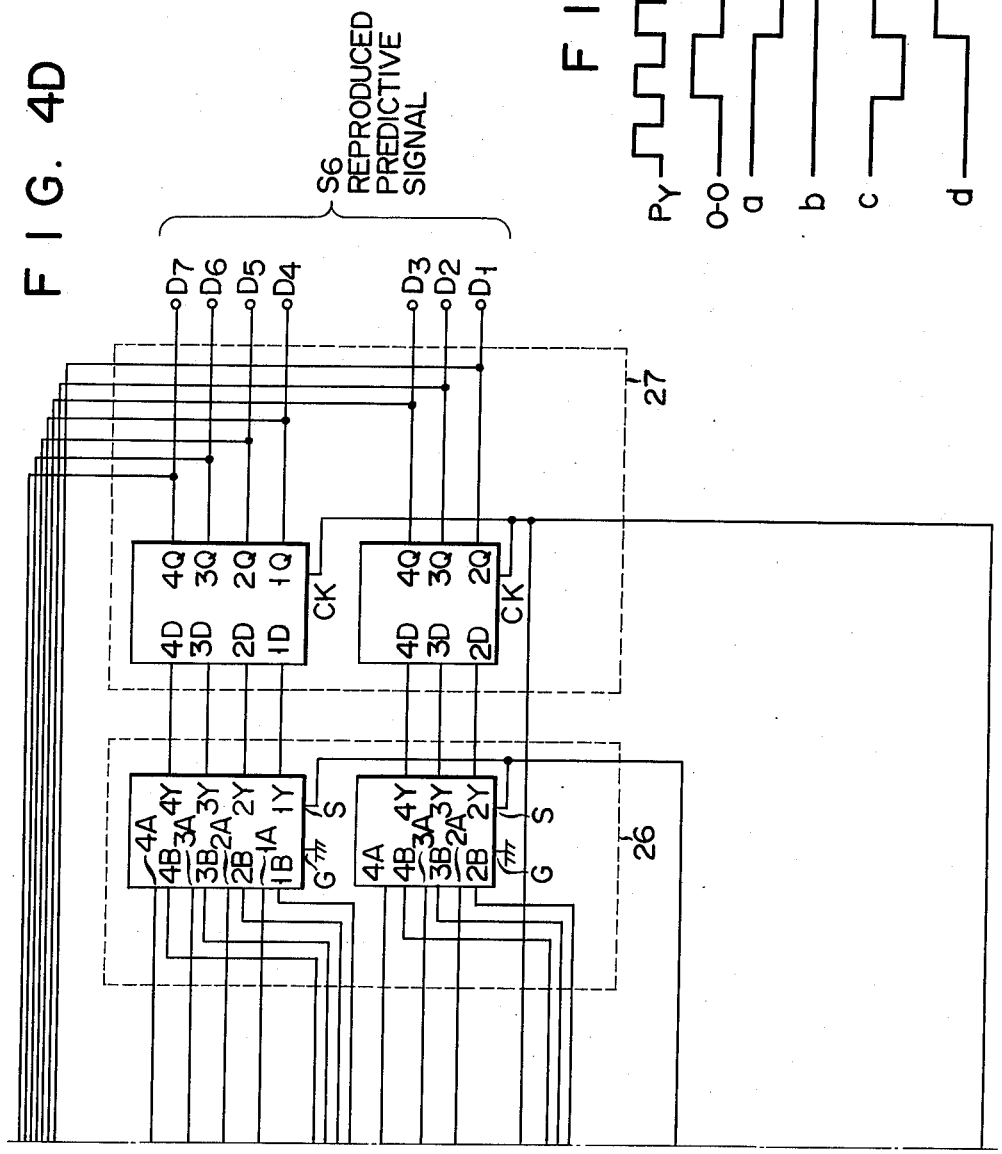

There will now be more concretely described by reference to FIGS. 4A to 4D the arrangement and operation of the signal transmission system of FIG. 1. No description is made of the already known coding circuit $1a$. The blocks of FIGS. 4A to 4D are denoted by the same numerals as those of FIG. 1. Referring to FIG. 4A, a delay circuit 31 (not shown in FIG. 1) included in the coding circuit $1a$ is used for adjustment of timing. The bits $TD_1$ to $TD_4$ of a DPCM signal $S_2$ whose timing has been adjusted by the delay circuit 31 are supplied to a circuit 30 including the signal insertion circuit 14 and specified pattern signal generator 17. A predictive signal $S_4$ formed of seven bits $D_1$ to $D_7$ is held by the signal holder 16. Where signals supplied from the circuit 31 and second delay circuit 12 to the DPCM signal detector 15 have the prescribed contents, then a 7-bit predictive signal $S_4$ held by the signal holder 16 and a 4-bit specified pattern signal $S_3$ supplied from the pattern signal generator 17 are inserted into the positions of three jwords (each formed of four bits) delivered from the second delay circuit 13. The resultant transmission signal train $S_5$ (in which each DPCM signal or word is formed of four bits $TD'_1$ to $TD'_4$) is sent forth to the receiving section 2 with the timing of said bits $TD'_1$ to $TD'_4$ adjusted by the delay circuit 32. FIG. 4B shows the waveforms of signals appearing in the respective sections of the DPCM signal detector 15. The circuits 31, 12, 13, 30a, 30b, 32, 16a, 16b are D type flip-flop circuits. The circuits 21 to 28 of FIGS. 4C and 4D are the same as those of FIG. 1.

In FIG. 4C, each word included in a signal train transmitted to the receiving section 2 is indicated in the form including four bits $T'_1$ to $T'_4$. Referential numeral 33 of FIG. 4C denotes a delay circuit for adjusting the timing of said bits (not shown in FIG. 1). Each output word (4 bits) from the delay circuit 33 is delayed for one sampling period by the third and fourth delay circuits 21, 22 respectively, and then supplied to the specified pattern signal detector 25. The second signal holder 24 holds a 4-bit word sent forth from the delay circuit 33 and an output from the third delay circuit 21. An output from the fourth delay circuit 22 is conducted to the adder 23 through the D—D converter 28. The first detection signal $CS_2$ (FIG. 1) from the specified pattern signal detector 25 is carried to the second signal holder 24 through a gate 25-1. The second detection signal $CS_3$ (FIG. 1) from said detector 25 is sent forth to the switching circuit 26 through a gate 25-2. An output from the switching circuit 26 is delivered to the predictor 27. A predictive signal $S_6$ (formed of seven bits $D_1$ to $D_7$) is drawn off from the predictor 27. The predictive signal $S_6$ is fed back to the adder 23. When the second control signal $CS_3$ (FIG. 1) is supplied to the switching circuit 26, then an output from the second signal holder 24 is supplied to the predictor 27. A 7-bit output signal (divided into two groups of 4 bits and 3 bits) from the second signal holder 24 is conducted to the predictor 27. The circuits 24a, 24b, 33, 21, 22, 23a, 23b are D type flip-flop circuits.

This invention is not limited to the foregoing embodiment. For example, the bit number of each word constituting a DPCM signal train and the bit number of each word constituting a predictive signal train should advisably be defined according to the form of a signal $S_1$ being transmitted to the receiving section 2. Said signal $S_1$ may be a voice signal. Further, transmission may be effected by a wire or wireless system.

What is claimed is:

1. A signal transmission system which comprises:
   input signal-coding means for sampling an input signal at a prescribed sampling period and converting said sampled data into a predictive signal train and a differential pulse code modulated (DPCM) signal train, each signal train including the information of said input signal;
   transmission signal train-forming means coupled to said input signal-coding means and which is supplied with said DPCM signal train and said predictive signal train, and including means, when, a specified group of adjacent words included in said DPCM signal train is detected to have prescribed contents, for replacing the specified group of adjacent words by a specified pattern signal never applied as a DPCM signal and a predictive signal, thereby forming a transmission signal train to be transmitted; and
   predictive signal train-reproducing means for receiving the transmitted transmission signal train and detecting said specified pattern signal in said received transmission signal train and inserting said transmitted predictive signal into the respective positions of said adjacent words, thereby reproducing said predictive signal train previously produced by said input signal-coding means out of said received transmission signal train.

2. The signal transmission system according to claim 1, wherein the transmission signal train-forming means comprises:
   a first delay circuit for delaying the DPCM signals for one sampling period;
   a second delay circuit for delaying an output from the first delay circuit for one sampling period;
   a DPCM signal detector which is supplied with the DPCM signal train delivered from the input signal-coding means, the output from the first delay circuit and the output from the second delay circuit, and, when detecting that a specified group of adjacent words constituting the DPCM signal train has the prescribed contents, issuing a detection signal;
   a first signal holder coupled to said DPCM signal detection and which, upon receipt of the detection signal, holds the predictive signal supplied from the input signal-coding means;
   a circuit for generating the specified pattern signal; and a signal insertion circuit which is coupled to the second delay circuit, specified pattern signal generator and first signal holder, and, upon receipt of a detection signal from said DPCM signal detector, which inserts the specified pattern signal and the predictive signal held by the first signal holder into the positions of said specified adjacent words constituting the DPCM signal train, thereby forming said transmission signal train.

3. The signal transmission system according to claim 2, wherein the predictive signal train-reproducing means comprises:
a third delay circuit for delaying the words included in the transmission signal train received for one sampling period;
a fourth delay circuit for delaying the output from the third delay circuit for one sampling period;
a specified pattern signal detector responsive to the output of the fourth delay circuit for producing first and second detection signals when detecting from the output from the fourth delay circuit said specified pattern signal included in the received transmission signal train;
a second signal holder which, upon receipt of the first detection signal, holds the transmission signal and the output from the third delay circuit;
a predictor for generating said predictive signal train;
an adder for adding an output from the fourth delay circuit to the predictive signal supplied from the predictor; and
a switching circuit which, upon receipt of the second detection signal, conducts an output from the second signal holder to the predictor and in the absence of said second detection signal, sends forth an output from the adder to the predictor.

4. The signal transmission system according to claim 1, wherein the predictive signal train-reproducing means comprises:
a third delay circuit for delaying the words included in the transmission signal train received for one sampling period;
a fourth delay circuit for delaying the output from the third delay circuit for one sampling period;
a specified pattern signal detector responsive to the output of the fourth delay circuit for producing first and second detection signals when detecting from the output from the fourth delay circuit said specified pattern signal included in the received transmission signal train;
a second signal holder which, upon receipt of the first detection signal, holds the transmission signal and the output from the third delay circuit;
a predictor for generating said predictive signal train;
an adder for adding an output from the fourth delay circuit to the predictive signal supplied from the predictor; and
a switching circuit which, upon receipt of the second detection signal, conducts an output from the second signal holder to the predictor and in the absence of said second detection signal, sends forth an output from the adder to the predictor.

5. The signal transmission system according to claim 1 wherein said prescribed contents detected by said transmission signal train-forming means comprises a pattern wherein at least two adjacent words have a numerical value of zero.

6. The signal transmission system according to claim 1 wherein said prescribed contents detected by said transmission signal train-forming means comprises a pattern wherein adjacent words have a numerical value of plus or minus 1.

7. The signal transmission system according to claim 6 wherein said prescribed pattern is "+1, −1, +1."

8. The signal transmission system according to claim 6 wherein said prescribed pattern is "−1, +1, −1."

* * * * *